United States Patent [19]

Tobias

[11] Patent Number: 5,277,042
[45] Date of Patent: Jan. 11, 1994

[54] AUTOMOTIVE, STEERING WHEEL ANTI-THEFT DEVICE

[75] Inventor: Marc W. Tobias, Sioux Falls, S. Dak.

[73] Assignee: Winner International Corporation, Sharon, Pa.

[21] Appl. No.: 996,738

[22] Filed: Dec. 23, 1992

[51] Int. Cl.⁵ .............................................. B60R 25/02
[52] U.S. Cl. ...................................... 70/209; 70/226; 70/419
[58] Field of Search .................. 70/209, 226, DIG. 9

[56] References Cited

U.S. PATENT DOCUMENTS

| | | | |
|---|---|---|---|
| 4,738,127 | 4/1988 | Johnson | 70/209 |
| 4,935,047 | 6/1990 | Wu | 70/209 |
| 4,949,561 | 8/1990 | Solow et al. | 70/209 |
| 5,040,388 | 8/1991 | Chen | 70/209 |
| 5,113,673 | 5/1992 | Shen | 70/209 |
| 5,119,651 | 6/1992 | Yang | 70/226 X |
| 5,131,245 | 7/1992 | Chen | 70/209 |
| 5,142,889 | 9/1992 | Liu | 70/209 |

Primary Examiner—Lloyd A. Gall
Attorney, Agent, or Firm—Body, Vickers & Daniels

[57] ABSTRACT

A mechanical anti-theft device of the type applied to the steering wheel of an automotive vehicle which automatically ratchets to it's applied position without necessity of key lock actuation is provided with several security enhancing features which cumulatively prevent or make the device exceedingly difficult to unlock using conventional burglary tools or lock picking techniques. The features include configuring the ratchet teeth of the telescoping rod member in a way which minimizes any attempt to deactivate the lock unless the key is used. In combination with the ratchet teeth configuration, the lock pawl mechanism is configured to include an arcuate, transversely extending apex edge line or surface which cooperates with or is sized to be coincident with the rod members circumference to prevent a wedge, shim or pick from being readily easily inserted between pawl and ratchet tooth to force a retraction of the pawl.

16 Claims, 4 Drawing Sheets

AUTOMOTIVE, STEERING WHEEL ANTI-THEFT DEVICE

The present invention relates generally to the field of automotive anti-theft devices, and more particularly to automobile anti-theft devices which attach to the vehicle's steering wheel.

The invention is particularly applicable to and will be described with specific reference to steering wheel, anti-theft locking devices of the type which automatically ratchet from a collapsed, unapplied position to a telescoped or extended locked position However, it will be appreciated by those skilled in the art that the invention may be applied to automotive steering wheel lock devices which do not provide for automatic ratcheting, or, alternatively, to other types of mechanical, automotive anti-theft devices (such as brake-wheel locking devices) which do provide automatic ratcheting from an unapplied or stored position to an applied position.

INCORPORATION BY REFERENCE

Johnson 4,738,127 dated Apr. 19, 1988 and Wu 4,935,047 dated Jun. 19, 1990 are incorporated in their entirety by reference herein so that details of the devices described in the aforementioned patents, which are known to those skilled in the art, need not be shown, disclosed, or discussed in detail herein. The aforementioned patents are all owned by the assignee of the present invention and the present invention may be viewed as an improvement over the Johnson and Wu patents.

BACKGROUND

A chronological development of mechanical, anti-theft devices is contained in the Background sections of both Johnson and Wu patents which are incorporated by reference herein and the reader is advised to review those patents for a more thorough description of the prior art than that which will be presented in the specifications hereof. Suffice it to simply note that vehicular anti-theft devices of the type to which this invention relates are those in which a protruding portion of the device extends beyond the periphery of the steering wheel (to which the device is attached) to prevent continued rotation of the steering wheel by the protrusion interfering with or contacting something within the interior of the vehicle. The vehicle is not totally disabled by the device but nevertheless rendered unsuitable for driving because the steering wheel cannot be rotated any significant degree.

The Johnson patent describes a device marketed under the brand name "THE CLUB" which has enjoyed significant commercial success within and outside the United States. This success is attributed in part to the telescoping rod-sleeve nature of the device in combination with a key actuated lock which utilizes a ball detent to permit the serrated rod to ratchet out from the sleeve or tube member into an applied position on the steering wheel. The Johnson device has received widespread commercial success and is entirely satisfactory. However, it has a relatively secure, positive lock which requires rotation of a cylindrical, half-moon locking member into one of a plurality of serrated grooves formed in the rod to lock the device. While the Johnson lock is positive and somewhat secure, THE CLUB, nevertheless, requires that a key be inserted into the lock so that the device can be applied to the steering wheel as well as removed from the steering wheel when the driver wants to operate the vehicle.

The Wu patented device marketed under the brand name, SUPER CLUB, has also achieved widespread commercial success. The SUPER CLUB is conceptually similar to THE CLUB but has a lock which permits the device to be applied, from a collapsed position to the steering wheel of the vehicle without having to actuate the key lock. This feature is a convenience to the operator of the vehicle. That is, after the driver stops the car and removes the keys from the ignition, he applies the anti-theft device to the steering wheel. Having placed the keys into his pocket (or her purse), it is somewhat inconvenient to retrieve the keys to "unlock" the device so that it can be applied to the steering wheel of the vehicle and then "lock" the device after it is applied to the steering wheel. (Note, this "inconvenience" is not present when the device is to be removed since the driver already has taken out the keys to start the vehicle.) The SUPER CLUB provides a locking arrangement which achieves this objective. It permits the operator, without actuation of any key, to simply pull, or telescope, or ratchet the rod out of the sleeve or tube from a collapsed position to an extended or applied position in which the hooks from the rod and sleeve grasp the rim of the steering wheel in the conventional manner.

As the popularity of the SUPER CLUB and THE CLUB have grown, automotive thieves have become more cognizant or familiar with such devices as well as the countless imitations which are now on the market. It is, of course, well recognized that any anti-theft device can be defeated and that any accomplished thief can break into and steal any automobile no matter how sophisticated the anti-theft device applied to that automobile may be. Accordingly, it is a primary objective of any anti-theft device that the security of the device be established or set at a level which establishes a sufficient degree of "resistance" to deter professional car thieves from stealing a vehicle which is equipped with the anti-theft device. With respect to THE CLUB and the SUPER CLUB, the device is made of hardened steel so that it cannot be readily cut. The device uses a telescoped arrangement to prevent or minimize pry points which could otherwise be leveraged or utilized to remove the device from the steering wheel. Similarly, the mechanical arrangement in which the lock tumbler is positioned within the anti-theft device prevents or affords a significant degree of resistance to it's being removed or pried from the device. To defeat the device, the steering wheel rim has to be severed and even in this regard, the assignee has procured patents designed to prevent severing the steering wheel rim.

Notwithstanding such measures, for anti-theft devices utilizing designs of the lock type employed in the SUPER CLUB device, where the slack between rod and sleeve is taken up by a spring biased pawl which also functions as the key actuated locking mechanism, it has been discovered that in some instances, it is possible to "pick" the lock by conventional burglar tools. The procedure is to essentially wedge a burglar pick or shim between the spring biased ratchet pawl and the ratchet "tooth" in the rod member which receives the pawl to force the pawl to be wedged or retracted back into its bore thus permitting the rod to move relative to the sleeve. In this manner, it is conceptually possible to retract or push the rod member into the tube member and remove the device from the steering wheel.

SUMMARY OF THE INVENTION

Accordingly, it is a principal object of the present invention to provide a locking mechanism for an automotive, anti-theft device attached to the steering wheel which is secured against theft and cannot be "readily" picked with conventional-type burglary tools.

This object, along with other features of the invention, is achieved in an automotive anti-theft device of the type which is applied to a vehicle steering wheel and in which a rod member having first hook means is telescopically received within a sleeve member having second hook means. One of the members has a protruding portion extending beyond its hook for contacting some portion of the interior of the vehicle to prevent continued rotation of the steering wheel when the anti-theft device is attached to the steering wheel. The device includes a lock mechanism permitting the rod member to be drawn out of the sleeve member for attachment to the steering wheel and to be pushed into the sleeve member for removing the device from the steering wheel. The rod member has a plurality of longitudinally-spaced, circumscribing ratchet teeth, with each tooth including an annular stop surface extending generally perpendicular from the exterior surface of the rod radially inwardly to an inner rod position. Each tooth further includes a frusto-conical surface generally adjacent the annular stop surface with a frusto-conical surface having its minor diameter adjacent the inner position and its major diameter adjacent the rod's exterior surface. A longitudinally-extending, cylindrical, tooth surface portion extends between the major diameter of the frusto-conical surface of one ratchet tooth and the annular stop surface of an adjacent ratchet tooth and importantly, the cylindrical surface extends only a slight longitudinal distance along the rod member's axis. The lock means includes a pawl having an end adapted to fit within any selected ratchet tooth and abut against the annular stop surface when the device is in a locked position. The pawl end has a configured edge surface which in turn has an. apex that extends no more than a slight longitudinal distance so that the longitudinal distances of the cylindrical surface of the ratchet teeth and the slight longitudinal distance of the edge surface of the pawl make it difficult to withdraw the lock from the circumscribing teeth by wedging a pick, shim or foreign object between the surfaces.

In accordance with another aspect of the invention, the pawl edge apex surface is curvilinear and more specifically, is arcuate with a radius of curvature approximately equal to the radius of curvature of the exterior surface of the rod member. By configuring the pawl edge in a curvilinear or arcuate manner, it becomes exceedingly difficult to insert an object between the longitudinal surface of the ratchet tooth and the pawl edge apex surface to force the pawl to retract from engaging the ratchet tooth.

In accordance with a still more specific feature of the invention, the inside diameter of the sleeve member is larger than the outside diameter of the rod member, no more than a minimal distance and specifically no more than about 0.08" whereby it is increasingly difficult to wedge a pick, shim or foreign object between the rod teeth and the lock pawl in an attempt to "pick" the lock.

Yet another specific feature of the invention is to improve the security of the steering wheel anti-theft device of the type described above by constructing a device providing in combination a reduced clearance between sleeve I.D. and rod O.D.; a reduced longitudinal distance of the cylindrical exterior surfaces of the rod teeth and a curvilinear pawl edge so that such features, cumulatively, result in an anti-theft device, the security of which is not readily compromised by means of conventional, lock picking techniques.

It is yet another general feature of the invention to provide a vehicle steering wheel lock for mounting solely on the rim of the steering wheel which steering wheel lock includes i) an elongated, tubular sleeve member having a longitudinal axis, first and second ends, a first hook mechanism to engage the rim of the steering wheel from the inside thereof; ii) an elongated rod member telescopically receivable in the tubular member and having a second hook mechanism facing oppositely to the first hook mechanism to engage the rim of the steering wheel; iii) a projected portion extending beyond one of the hook mechanisms and in use beyond the rim when both hook mechanisms engage the rim; and, iv) a locking mechanism which includes a) a key operable lock which in a locked position permits telescopic movement of the rod member out of the tubular member but prevents telescopic movement of the rod member into the tubular member while in an unlocked position permits telescopic movement of the rod member into the tubular member and b) a plurality of longitudinally spaced ratchet teeth on the rod member with each tooth including an annular stop surface extending generally perpendicular from the exterior surface of the rod radially inwardly to an inner rod position, and a frusto-conical surface generally adjacent the annular stop surface having its minor diameter axis adjacent the inner position and its major diameter axis adjacent the rod member's exterior surface. Importantly, a cylindrical exterior surface extends only a slight longitudinal distance between the major diameter of the frusto-conical surface of one ratchet tooth and the annular stop surface of an adjacent ratchet tooth. The lock mechanism includes a ratchet pawl having an end adapted to fit within the circumscribing teeth and abut against the annular stop surface when in a locked position with the end having a configured edge surface extending only a slight longitudinal distance so that the slight longitudinal distance of the rod and the slight longitudinal distance of the pawl edge make it difficult to insert a foreign object into the lock mechanism to withdraw the pawl end from engaging the rod tooth. Further modifications include configuring the edge surface of the pawl which contacts the ratchet tooth to have an arcuate shape identical to the curvature radius of the rod member's cylindrical surface. In addition, the outside diameter of the rod member is maintained in close dimensional relationship with the inside diameter of the tubular member to enhance the lock security of the device.

It is an object of the invention to provide an improved, vehicular anti-theft device which possesses enhanced security features.

It is another object of the invention to provide an improved, vehicular anti-theft device which provides enhanced security features without any significant increase in the manufacturing cost of the device.

It is yet another specific object of the invention to provide in an automotive steering wheel lock which permits telescopic ratcheting of the device into an applied position on the vehicle's steering wheel, an improved mechanism for maintaining the lock in a burglar-proof, locked condition.

Still yet another object of the invention is to provide a cylindrical, telescoping rod-sleeve combination utilizing circumscribing ratchet teeth on the rod member and a lock actuated, spring-biased pawl to engage a selected ratchet tooth which has specially configured ratchet teeth to insure the pawl remains positioned within any one selected tooth.

These and other objects of the invention will become apparent to one skilled in the art upon reading and understanding the detailed description of the invention set forth in the section below taken together with the drawings which form a part hereof and wherein:

DETAILED DESCRIPTION OF THE PREFERRED EMBODIMENT

Figure 1:
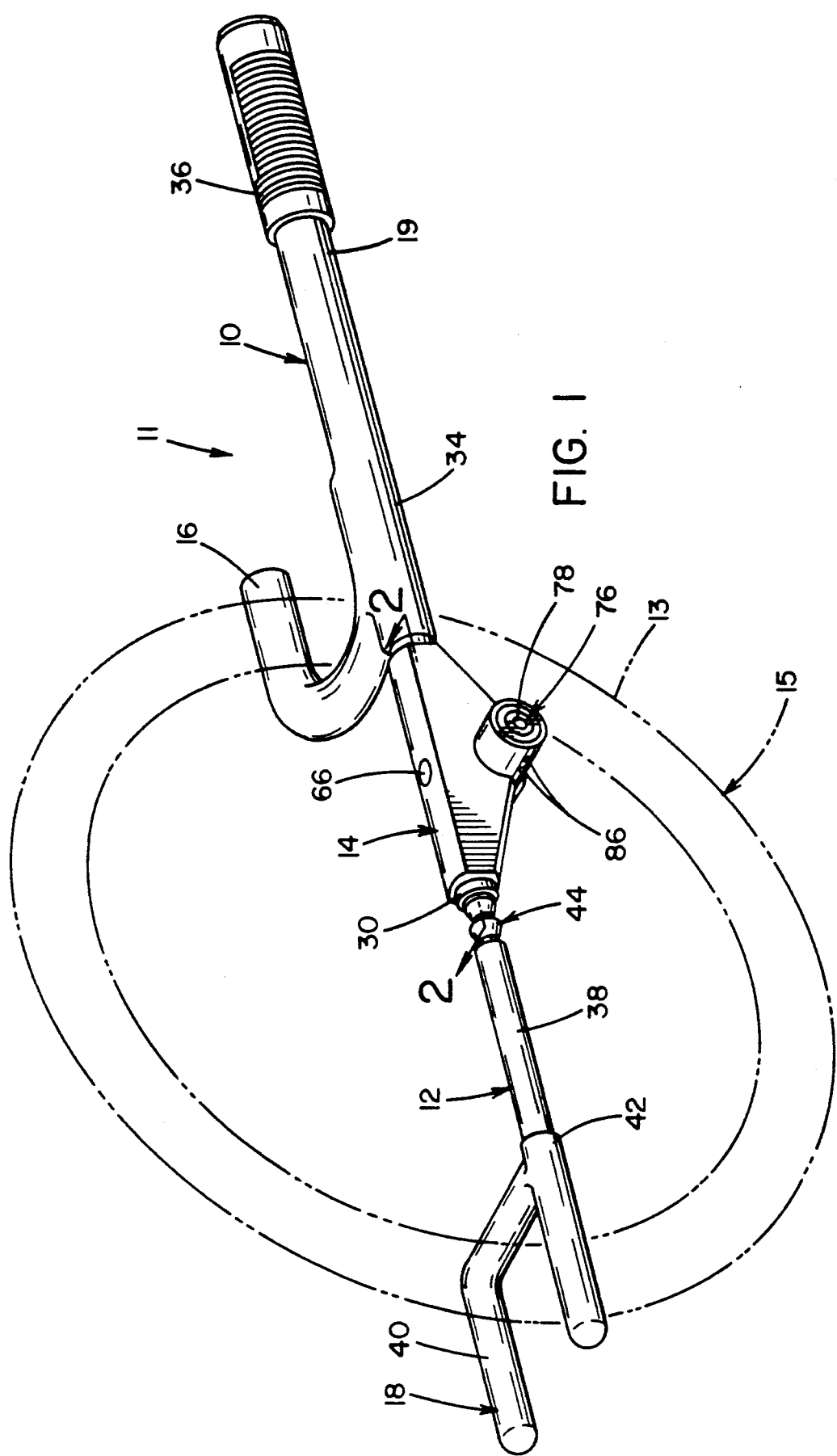
FIG. 1 is a perspective view of the steering wheel lock in accordance with the present invention shown in a position taken when mounted on a steering wheel.

Referring now to the drawings wherein the showings are for the purpose of illustrating a preferred embodiment of the invention only and not for the purpose of limiting same, in FIG. 1 there is shown a perspective view of a steering wheel lock 11 according to the present invention applied to a rim 13 of a steering wheel 15 shown in phantom lines. Broadly stated, steering wheel lock 11 is comprised of an elongated tubular or sleeve member 10, an elongated rod member 12 which is telescopically received within tubular member 10, and a lock housing 14. Wheel rim hooks 16 and 18 for engaging opposed portions of the steering wheel from the inside thereof are provided on tubular member 10 and rod member 12, respectively. Lock housing 14 includes means to position and lock rod member 12 stationary with respect to tubular member 10 at any one of a plurality of axially spaced positions. Tubular member 10 includes a projected portion 19 extending beyond first rim hook 16 sufficiently to come into contact with the vehicle interior when steering wheel 15 is turned and thereby to block or prevent complete rotation of the wheel.

Figure 2:
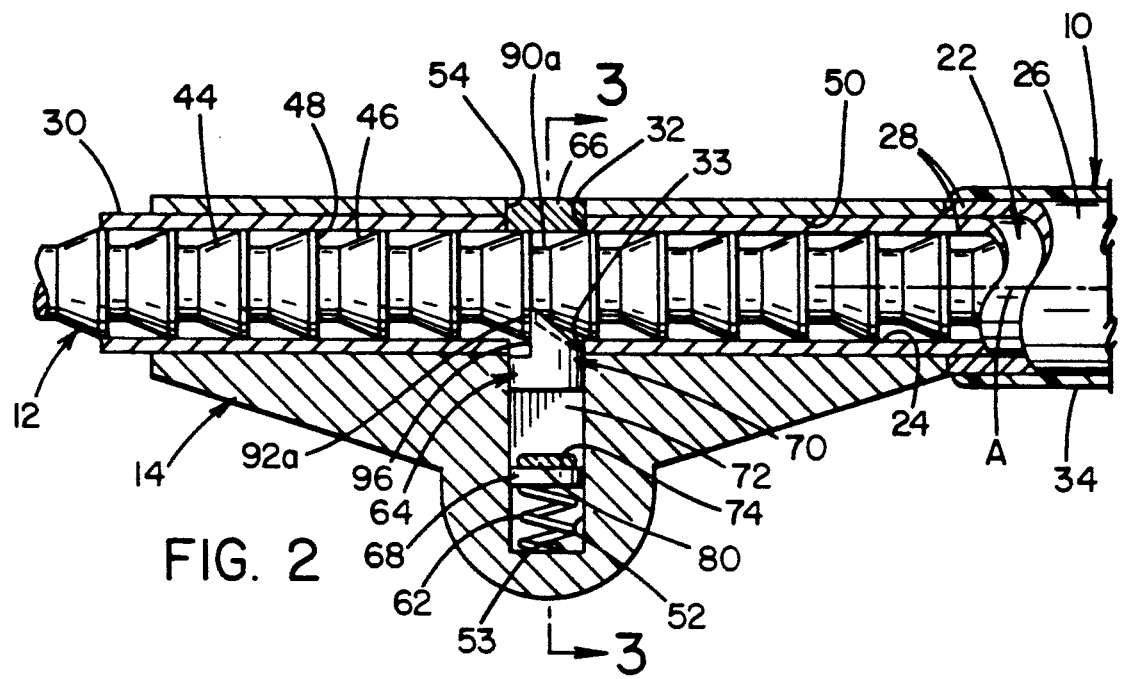
FIG. 2 is a sectioned view taken along lines 2—2 of FIG. 1.

More specifically, elongated tubular member 10 is comprised of an elongated tube 22 of circular cross-section concentric with axis A (FIG. 2). Tube 22 defines a central passage 24 of circular cross-section concentric about axis A, and is surrounded by outer sleeve 26 to provide a double walled section 28 as shown in FIG. 2. A portion 30 of tube 22 extends axially beyond the end of the double walled section 28 and includes a pair of aligned apertures 32, 33. First wheel rim hook 16 (FIG. 1) has a generally U-shape opening in the axial direction away from extended portion 30 of tubular member 10, and is rigidly secured to tubular member 10 at outer sleeve 26 of double walled section 28. Tube 22 and outer sleeve 26 are preferred to be lengths of standard structural steel pipe welded together. First wheel rim hook 16 is also preferred to be standard structural steel pipe bent or otherwise formed into the U-shaped configuration and welded to outer sleeve 26. A durable plastic coating 34 is provided over outer sleeve 26 and first wheel rim hook 16 to provide a nonabrasive surface over tubular member 10. A handle grip 36 is provided at the end of tubular member 10.

Elongated rod member 12 is comprised of an elongated rod 38 (FIG. 1) of circular cross-section. The outside diameter ("O.D.") of rod 38 is dimensioned slightly less than the inside diameter ("I.D.") of passage 24 in tubular member 10 to enable rod 38 to move freely in telescopic fashion within tubular member 10. Generally L-shaped member 40 is integrally secured to the end of rod 38 to form second wheel rim hook 18 which opens oppositely to first wheel rim hook 16 for engagement with an opposed portion of the steering wheel. A second durable plastic coating 42 is provided over second wheel rim hook 18. A plurality of ratchet teeth 44 are provided in an axially spaced longitudinal series along rod 38. Ratchet teeth 44 each include frusto-conical surface 46 extending radially outwardly in an axial direction away from second wheel rim hook 18, and annular stop surface 48 extending perpendicularly to axis A. Rod 38 and generally L-shaped member 40 are preferred to be case hardened steel.

Lock housing 14 comprises lock passageway 50 of circular cross-section and having a diameter corresponding to the outside diameter of extended portion 30 of tube 22 so that lock housing 14 is telescopically receivable over extended portion 30 to be mounted thereon. Lock housing 14 includes first bore 52 extending perpendicularly to axis A and having closed inner end 53 and open outer end 54. First bore 52 crosses lock passageway 50 and is aligned with apertures 32, 33 in extended portion 30 of outer sleeve 26. Lock housing 14 further comprises second bore 56 having inner end 58 opening on first bore 52 and open outer end 60. The locking means disposed within lock housing 14 includes coil spring 62 acting in an axial direction at closed inner end 53 of first bore 52, and ratchet pawl 64 received in first bore 52 to extend from coil spring 62 through aperture 33 into central passage 24 of elongated tube 22. Open outer end 54 of bore 52 is closed as by plug 66. Ratchet pawl 64 comprises shaft 68 having angular end surface 70, recess 72, and contact surface 74 within recess 72. Locking means further comprises key lock cylinder 76 having keyhole 78, torque blade 80 or alternatively cylindrical cam (not shown). Lock cylinder or tumbler 76 is received within second bore 56 against bore shoulder 84 and is secured therewithin by means of locking pins 86. Torque blade (or cam) 80 extends into recess 72 in ratchet pawl 64 to register with and cooperate with torque blade surface 74 in a manner to be described below.

As thus far described, anti-theft device 11 of the invention is conventional. The security of anti-theft device 11 is enhanced or improved by changes shown in FIGS. 4, 5 and 6. Fundamentally, there are three changes, each of which, singularly, improves or enhances the security of device 11 and which cumulatively significantly increase the security of anti-theft device 11 to the point where it is virtually impossible to mechanically pick or unlock the lock without the key being applied to unlock lock tumbler 76.

Figure 4:
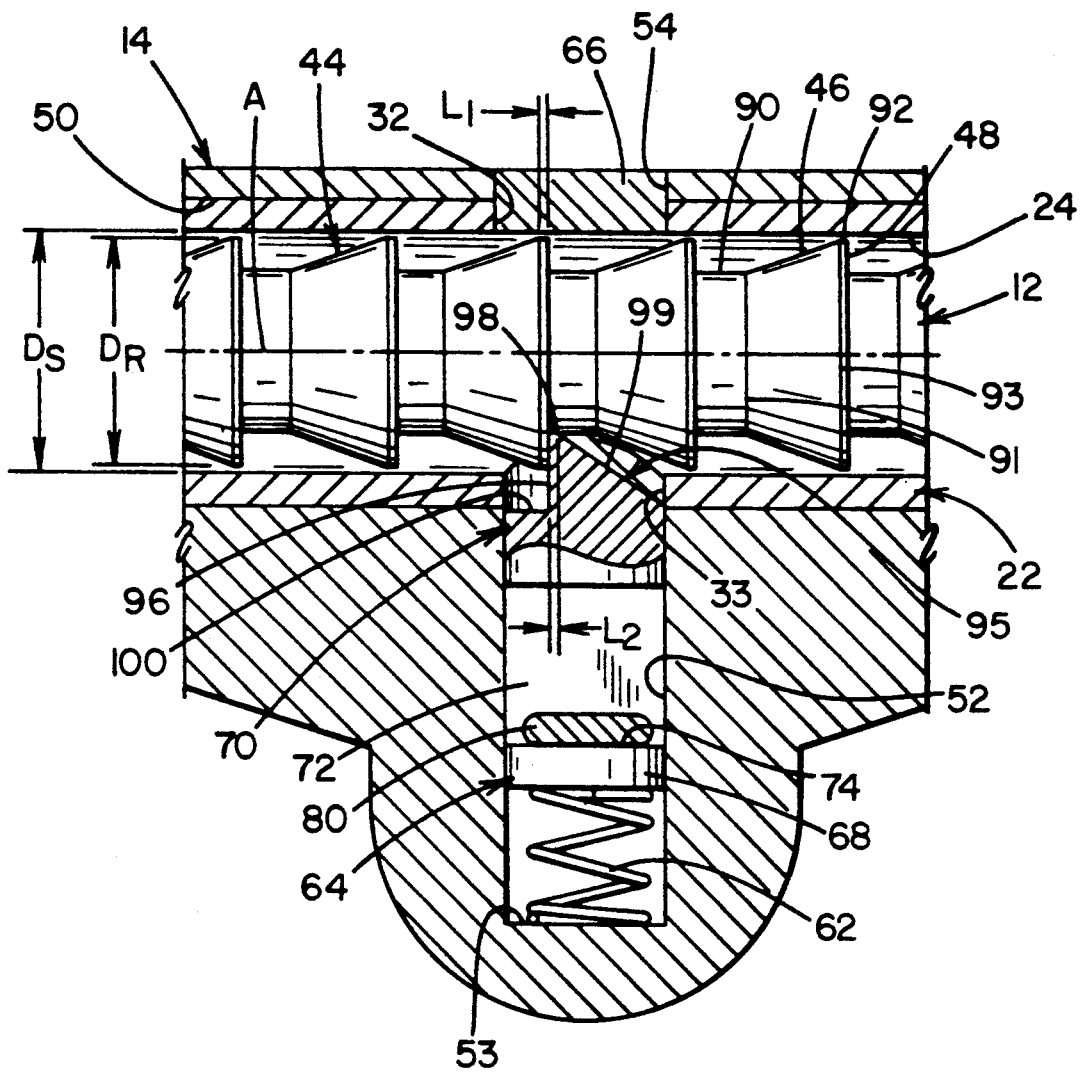
FIG. 4 is an enlarged view of a portion of the apparatus shown in FIG. 2.

The first change is the dimensional relationship between the inside diameter, I.D., of sleeve member 10 and the outside diameter, O.D., of ratchet teeth 44. As best shown in FIG. 4, the diameter of rod 12 is designated $D_R$. Each ratchet tooth 44 basically comprises an annular stop surface 48 and a frusto-conical surface 46 adjacent annular stop surface 48. In the preferred embodiment each ratchet tooth 44 also includes two cylindrical surfaces. There is a first cylindrical surface 90 which extends between annular stop surface 48 and frusto-conical surface 46. Specifically, first cylindrical surface 90 extends from or is continuous with the minor diameter axis which is indicated by line 91 of frusto-conical surface 46. First cylindrical surface 90 is entirely optional. It is contemplated that each ratchet tooth 44 could simply comprise the annular stop surface 48 which would extend radially inwardly until it met minor diameter axis 91 of frusto-conical surface 46. (In the preferred embodiment, annular stop surface 48 extends radially inwardly to an inner portion whereat it meets first cylindrical surface 90 which has a diameter equal to minor diameter 91 of frusto-conical surface 46.) As shown in the drawings, frusto-conical surface 46 extends longitudinally and radially outwardly from its minor diameter axis 91 until it intersects second cylindrical surface 92. Second cylindrical surface 92 thus comprises or defines the major diameter axis which is indicated by line 93 in FIG. 4 of frusto-conical surface 46. Major diameter axis 93 and the diameter of second cylindrical surface 92 is $D_R$ and is equal to the diameter of solid portion 38 of rod member 12.

Thus, rod member 12 is supported or maintained in longitudinal alignment along axis A within tubular sleeve member 10 by second cylindrical surface 92 of each ratchet tooth 44 contacting the inside diameter or central passage 24. The inside diameter of central passage 24 is shown in FIG. 4 as $D_S$. It should be clear that any attempt to "pick" the lock requires that a shim be inserted between rod member 12 and sleeve member 10 and slid within or fed between the clearance between these two members until ratchet pawl 64 is contacted. There must be a tolerance or space between the inside diameter, the I.D. of sleeve member 10, $D_S$ and the outside diameter, or O.D. of rod member 12, $D_R$, because telescopic movement is required between rod member 12 and sleeve member 14. However, rod and sleeve members 10, 12 are sized to be almost equal to one another and, in accordance with one aspect of the invention, the inside diameter, $D_S$, of sleeve member 10 is no more than 0.08" than the outside diameter, $D_R$, of rod member 12. This is one specific feature of the invention which in and of itself enhances the security of anti-theft device 11.

In accordance with another aspect of the invention and as best shown in FIG. 4, the length of second surface 92 is designated as $L_1$ in FIG. 4 and is maintained at a minimal distance not greater than about 0.04". Theoretically, $L_1$ could be and is theoretically desirable to be "0". As a practical matter, the consumer's hands inevitably will contact ratchet teeth 44 of rod member 12 and if the longitudinal distance between frusto-conical surface 46 and annular stop surface 48 i.e. second longitudinal surface 92 is a line, it is quite possible that the intersection begins to approach a cutting edge capable of puncturing the skin of the consumer. Accordingly, some distance is desired to break the "cutting-edge" which could otherwise exist between the intersection of frusto-conical surface 46 with annular stop surface 48. A similar construction exists with respect to the ratchet pawl end 70 of pawl 64.

Figure 5:
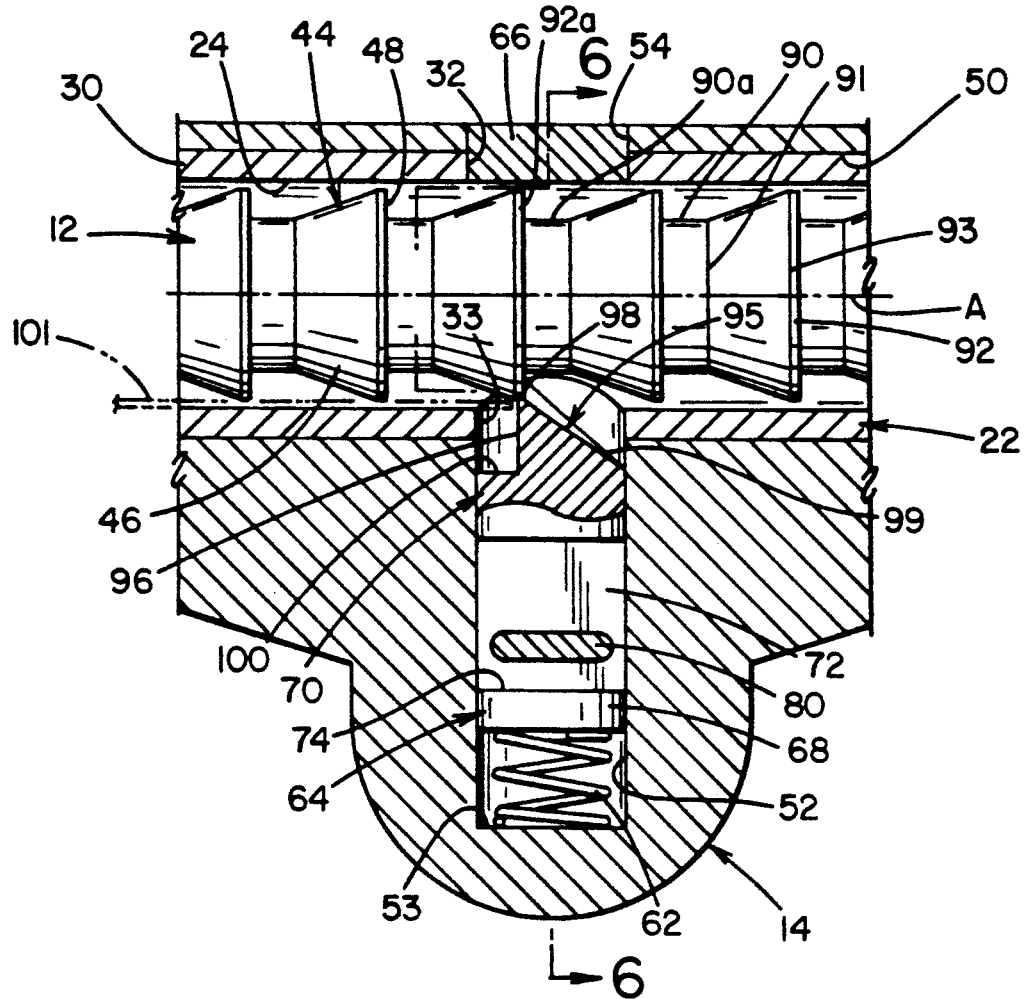
FIG. 5 is a view similar to FIG. 4 but with the parts positioned in a different orientation.

Ratchet pawl end 70 extends into one of ratchet teeth 44 and more specifically, comprises an edge surface 95 from which extends a flat contact surface 96 which contacts the rod's annular stop surface 48 to prevent movement of rod 12 towards the right when viewing FIGS. 2, 4 and 5. More specifically, pawl edge surface 95 includes an apex surface 98 on one side of which extends a pawl flat contact surface 96 and on the other side of which extends a frusto-conical tapering surface 99. In the preferred embodiment, apex surface 98 is a line but is shown in the drawings to have some longitudinal or length spacing designated as L, in FIG. 4. This is merely to illustrate that while apex surface 98 is preferred to be a line, it could have a length $L_2$ and if it does have a length $L_2$ then the length $L_2$ does not exceed about 0.04". The reason for making $L_1$ and $L_2$ small will become clear shortly.

Completing the description of the profile of edge surface 95, there is a stepped segment 100 which corresponds to first cylindrical surface 90 and like $L_2$ is not necessary not desired in the preferred embodiment but merely shown in the drawings to simply illustrate a variation in the profile of edge surface 95. That is, in the preferred embodiment, edge surface 95 simply comprises the frusto-conical tapering surface 99 extending to apex surface 98 and from which on the opposite side thereof extends pawl contact surface 96. Other segments can be added to pawl end 70 but the three adjacent segments or surfaces, i.e. apex surface 98, tapering surface 99 and pawl flat contact surface 96, are required in any pawl end 70 configuration.

It should be apparent to those skilled in the art that first cylindrical surface 90 provides some "slop" or free movement of rod member 12 out of sleeve member This is believed desirable to the consumer in that it gives some "feel" or "adjustment" in applying anti-theft device 11 to steering wheel rim 15. First cylindrical surface 90 is not believed necessary and can be eliminated, it being noted that rod frusto-conical surface 46 also provides the tolerance but with a slightly different "feel" than that achieved with the rod teeth 44 configuration illustrated in the drawings.

Figure 6:
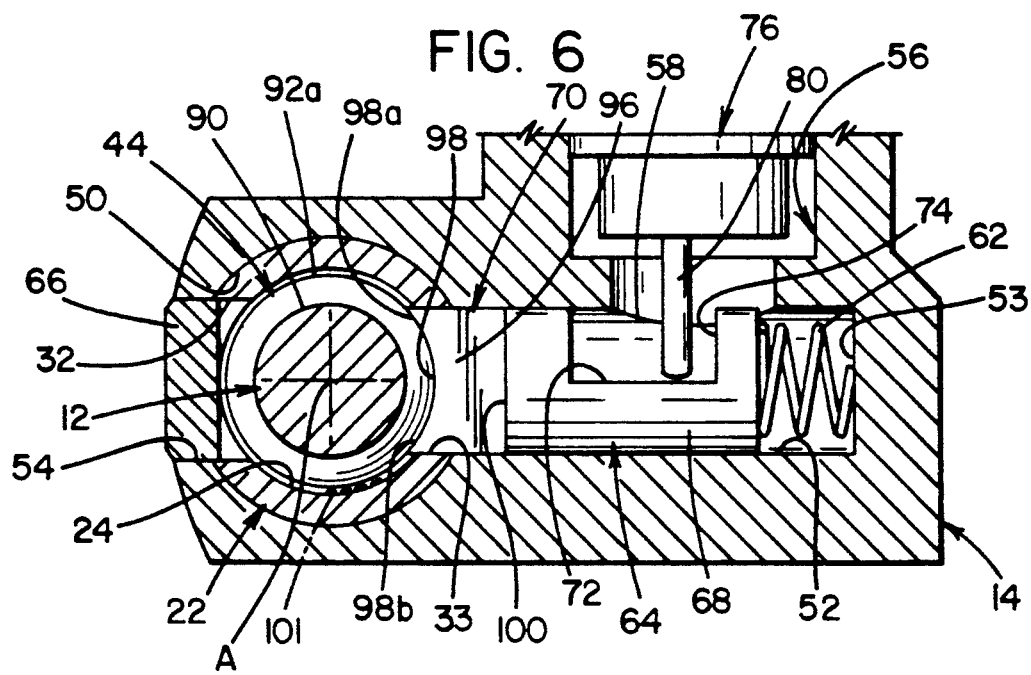
FIG. 6 is a view taken along lines 6—6 of FIG. 5.

Finally, as best illustrated in FIG. 6 apex surface 98 is curvilinear and more specifically is arcuate and more specifically has the same radius of curvature as does the outside diameter $D_R$ of rod member 12. When apex surface 98 is configured in this manner, and with pawl 64 rod member 12 positioned as shown in FIGS. 5 and 6, the opposite ends 98a, 98b (FIG. 6) of surface 98 of pawl 64 relative to ratchet teeth 44 are coincident with outer surface 92 of the ratchet teeth as best shown in FIG. 6. If apex surface 98 was straight as in the prior art arrangements, a space would exist between ratchet teeth 44 and pawl apex surface 98.

It is believed that the operation of the automatic ratcheting lock of the anti-theft device 11 of the present invention is obvious to those skilled in the art. However, if a detailed explanation is desired, reference is to be had to Wu 4,935,047 for such explanation. For purposes of describing this invention, it should be sufficient to simply note that with the key not installed in a lock tumbler 76 and with rod member 12 telescoped into sleeve member 10 the device is applied to rim 13 of steering wheel 15 by simply pulling rod member 12 out of sleeve member 10 until hooks 16 and 18 enrage diametrically opposing portions of steering wheel rim 13 as shown in FIG. 1. Now with reference to FIGS. 5 and 6, as rod member 12 is pulled from sleeve member 10, rod member 12 will travel towards the left as viewed in FIG. 5 relative to lock housing 14. Spring 62 will bias ratchet pawl 64 within bore 52 so that ratchet pawl end 70 contacts ratchet teeth 44. More particularly, pawl segment 99 will travel along first cylindrical surface 90, then along frusto-conical surface 46, and finally along second cylindrical surface 92 of each ratchet tooth 44 until hooks 16 and 18 have been seated into diametrically opposing portions of steering wheel rim 13 at which time hooks 16, 18 will prevent further movement of rod member 12 towards the left as viewed in FIG. 5 while contact between pawl contact surface 96 and ratchet tooth stop surface 48 will prevent movement of rod member 12 towards the right as viewed in FIG. 5. To remove anti-theft device 11 from its applied position, a key is inserted into and turned within lock tumbler 76 which will withdraw the pawl 64 into a retracted position such as shown in FIG. 5 at which time rod member 12 is free to telescope into or out of sleeve member 10.

Now as noted, if the lock is to be picked, pawl 64 has to be pushed into its retracted position as shown in FIG. 5. This retracted position occurs when the cam member or torque blade 80 of lock tumbler 76 is actuated or, alternatively, when rod member 12 is moved towards the left as viewed in FIG. 5 in which instance the shape of ratchet teeth 44 force pawl the into bore 52 against the bias of spring 62. To "pick" lock, a pick, shim, or wedge shown in phantom lines as 101 in FIGS. 5 and 6 has to be inserted into the tubular lock housing 14 between sleeve 30 and rod member 12. As already noted, the tolerance between rod and sleeve has been reduced to no more than about 0.08″. It is appreciated that the shim or pick 101 is only a few thousands of an inch thick. Nevertheless, there is a length associated with lock housing 14 which, within the tolerance's specified, makes it difficult to feed shim 101 from the entrance end of lock housing 14 to a position adjacent pawl 64 i.e. plug or rivet 66. Next, it can be envisioned that by reducing distance $L_1$ to a minimum, the position of the parts as shown in FIG. 5 exist only instantaneously as the rod member is ratcheted out into an applied position and this position is not a stable, readily produced, or duplicated position. That is, ratchet pawl 64 will either be at frusto-conical surface 46 or at first cylindrical surface 90. It cannot be stably positioned in between these two positions. Yet if the lock is to be picked, this is how the rod and sleeve have to be positioned to initially force a retraction of pawl 64. That is, it should become somewhat clear upon studying FIGS. 2, 3, 5 and 6 that to pick the lock, i.e. to move pawl 62 from its FIG. 2 to its FIG. 5 position, shim or wedge 101 has to be worked or wedged past second cylindrical surface 92a (FIGS. 2, 5) into the space between first cylindrical surface 90a and central passage 24, not occupied by ratchet pawl end 70. Next, with shim, wedge, or pick 101 thus positioned, the pick has to be circumferentially walked and forced within or between one of the ends 98a, 98b of apex surface 98 of pawl 64 to force pawl end 70 downward into lock bore 52. Prior to the present invention, the rather long spacing $L_1$ of second cylindrical surface 92 provided space or a support surface which permitted wedge or pick 101 to be walked or jimmied circumferentially through the intersection of pawl apex surface 98 with second cylindrical surface 92 and to force pawl 64 back into bore 52. By reducing the distance of $L_1$ it becomes increasingly difficult to try to wedge the pick or shim 101 against pawl 62 i.e. "walking" or "shimming" pick 101 to contact apex surface 98.

Figure 3:
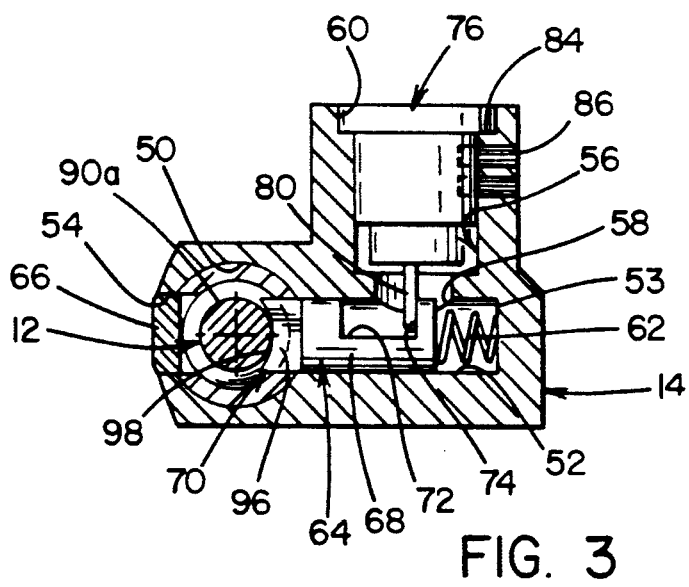
FIG. 3 is a sectioned view taken along lines 3—3 of FIG. 2.

Finally, by curving apex surface 98 the space between pawl end 70 and ratchet tooth 44 doesn't exist and certainly doesn't exist to the extent that it existed previously as can be seen from the drawings of FIGS. 3 and 6. It becomes then, very difficult first to "work" wedge or pick 101 into it's proper position and to then wedge shim or pick 101 between apex surface ends 98a or 98b to force a retraction of pawl 64. In summary, one of the three identified changes significantly enhances the security of anti-theft device 11, while the cumulative effect of all three changes, for all practical purposes, makes anti-theft device 11 for all practical purposes, pick-proof.

The invention has been described with reference to a preferred embodiment. The invention includes or is premised on, in part, a recognition of a problem potentially affecting the security of anti-theft devices of the type described herein. The invention contemplates providing one or more modifications, preferably three, to the device to enhance the overall security of the anti-theft device. Other obvious security enhancing modifications or alternatively, obvious modification to those modifications suggested herein (and other than those which have been discussed herein) are intended to be included within the invention in so far as they come within the scope of the patent as claimed or the equivalents thereof.

Having thus described the invention, the following is claimed:

1. In an automotive anti-theft device of the type applied to a vehicle's steering wheel in which a rod member having first hook means is telescopically received within a sleeve member having an inner diameter and having second hook means, one of said members having a protruding portion extending beyond its hook means for contacting some portion of the interior of said vehicle to prevent continued rotation of said steering wheel when said device is attached to said steering wheel by said first and second hook means engaging diametrically opposed portions of said steering wheel, said device including lock means permitting said rod member to be drawn out of said sleeve member for attachment to said steering wheel and to be pushed into said sleeve member for dismantling said device from said steering wheel, the improvement comprising:

said rod member having an exterior surface and a plurality of longitudinally spaced, circumscribing ratchet teeth having an outer diameter, each tooth including an annular stop surface extending generally perpendicular from the exterior surface of said rod member radially inwardly to an inner rod position, and a frusto-conical surface generally adjacent said annular stop surface, said frusto-conical surface having a minor diameter adjacent said inner position and a major diameter adjacent said exterior surface;

said lock means including a pawl having an end adapted to fit between said circumscribing teeth and abut against said annular stop surface when in a locked position, said inner diameter of said sleeve member being greater than said outer diameter of said ratchet teeth by no more than about 0.08 inch thereby making it difficult to access and displace said pawl from said circumscribing teeth to pick said lock.

2. The anti-theft device of claim 1, wherein each said tooth has a cylindrical exterior surface between said major diameter of said frusto-conical surface and said annular stop surface of said tooth, said cylindrical surface extending a longitudinal distance along said rod member no more than about 0.04 inch.

3. The anti-theft device of claim 2, wherein said pawl end has an edge surface which extends longitudinally a distance not more than about 0.04 inch.

4. The anti-theft device of claim 3, wherein said edge surface is arcuate and has a radius of curvature about equal to that of the exterior surface of said rod member.

5. In an automotive anti-theft device of the type applied to a vehicle's steering wheel in which a rod member having first hook means is telescopically received within a sleeve member having second hook means, one of said members having a protruding portion extending beyond its hook means for contacting some portion of the interior of said vehicle to prevent continued rotation of said steering wheel when said device is attached to said steering wheel by said first and second hook means engaging diametrically opposed portions of said steering wheel, said device including lock means permitting said rod member to be drawn out of said sleeve member for attachement to said steering wheel and to be pushed into said sleeve member for dismantling said device from said steering wheel, the improvement comprising:

said rod member having an exterior surface and a plurality of longitudinally spaced, circumscribing ratchet teeth, each tooth including an annular stop surface extending generally perpendicular from the exterior surface of said rod member radially inwardly to an inner rod position, and a frusto-conical surface generally adjacent said annular stop surface, said frusto-conical surface having a minor diameter adjacent said inner position and a major diameter adjacent said exterior surface, a cylindrical exterior tooth surface extending between said major diameter of said frusto-conical surface and said annular stop surface of said tooth, said cylindrical tooth surface extending a longitudinal distance along said rod member no more than about 0.04 inch; and said lock means including a pawl having an end adapted to fit between said circumscribing teeth and abut against said annular stop surface when in a locked position, and said longitudinal distance of said cylindrical surface of said tooth making it difficult to engage said pawl end to withdraw said pawl from said circumscribing teeth to pick said lock.

6. The anti-theft device of claim 5, wherein said pawl end has an edge surface which is curvilinear and extends longitudinally a distance not more than about 0.04 inch.

7. The anti-theft device of claim 5, wherein said pawl end has an edge surface which is arcuate and has a radius of curvature about equal to that of the exterior surface of said rod member.

8. The anti-theft device of claim 7, wherein said edge surface of said pawl end extends a longitudinal distance not more than about 0.040".

9. The anti-theft device of claim 5, wherein said sleeve member has an inner diameter larger than the outside diameter of said cylindrical exterior tooth surface by no more than about 0.08".

10. A vehicle steering wheel lock for mounting solely on the rim of a steering wheel comprising:

an elongated tubular sleeve member having an inner diameter, a longitudinal axis, first and second ends, first hook means to engage the rim of said steering wheel from the inside thereof;

an elongated rod member telescopically receivable in said tubular member and having an exterior surface and second hook means facing oppositely to said first hook means to engage the rim of said steering wheel from the inside;

a projecting portion extending beyond one of said hook means and in use beyond said rim when both hook means engage the rim; and locking means including a key operable lock which in a locked position permits telescopic movement of said rod member out of said sleeve member but prevents telescopic movement of said rod member into said sleeve member, and which in an unlocked position permits telescopic movement of said rod member into said sleeve member;

a plurality of longitudinally spaced ratchet teeth on said rod member; each tooth including an annular stop surface extending generally perpendicular from the exterior surface of said rod member radially inwardly to an inner rod position, and a frusto-conical surface generally adjacent said annular stop surface, said frusto-conical surface having a minor diameter adjacent said inner rod position and a major diameter adjacent said exterior surface, a cylindrical exterior tooth surface extending between said major diameter of said frusto-conical surface and said annular surface of said tooth, said tooth, said cylindrical tooth surface extending a first longitudinal distance along said rod member no more than about 0.04 inch; said cylindrical tooth surface having an outer diameter, said inner diameter of said sleeve member being greater than said outer diameter by no more than about 0.08 inch; and said locking means including a ratchet pawl having an end adapted to fit between said teeth and abut against said annular stop surface when in a locked position, said pawl end having a configured edge surface extending a second longitudinal distance whereby said first and second distances and said inner and outer diameters make it difficult to withdraw said pawl from said circumscribing teeth to pick said lock.

11. The vehicle steering wheel lock of claim 10, wherein said locking means includes a lock housing mounted on said first end of said tubular member, said lock housing including a passageway extending therethrough coaxially with said axis and adapted to receive said rod member telescopically therethrough, said ratchet pawl in said housing, spring means in said housing adapted to bias said ratchet pawl into engagement with said ratchet teeth when said rod member is received in said passageway, and said key operable lock being in said housing and adapted to withdraw said ratchet pawl out of engagement with said ratchet teeth against said spring bias.

12. A steering wheel lock as defined in claim 11, wherein said key operable lock has an open and a closed condition, and is adapted to permit said spring means to bias said ratchet pawl into engagement with said ratchet teeth when in said closed position and to withdraw said ratchet pawl out of engagement with said ratchet teeth against said spring bias when in said open condition.

13. A steering wheel lock as defined in claim 12, wherein said housing includes a first bore extending perpendicularly to said axis, said bore having a closed end internally of said housing and an open end opening on said passageway, said spring means comprises a coil spring received in said bore and disposed at said closed end thereof, said ratchet pawl is a shaft received in said bore and biased outwardly of said bore by said spring, said shaft having an angular end surface providing said configured edge surface, and;

said frusto-conical surfaces of said ratchet teeth are adapted to register with said angular end surface each to move said shaft into said bore against said spring as said rod member is telescopically moved out of said tubular member.

14. A steering wheel lock as defined in claim 13, further comprising a second bore in said housing having an inner end opening on said first bore and an outer end opening exteriorly of said housing, and a lock cylinder closely and securely received in said outer end of said second bore, said cylinder having cam means rotatable between a locked and an unlocked position, said cam means being engaged with said ratchet pawl to move said ratchet pawl against said spring as said cam means is rotated from said locked to said unlocked position.

15. The steering wheel lock of claim 14, wherein said configured edge surface of said pawl is curvilinear.

16. The steering wheel lock of claim 14, wherein said configured edge surface of said pawl is arcuate and has a radius of curvature about equal to that of the exterior surface of said rod member.

* * * * *